July 25, 1967

J. P. HAAS 3,332,326

SLITTER AND SCORER ASSEMBLY

Filed Sept. 21, 1964

INVENTOR.
JAMES P. HAAS.
BY Oscar B Brumback
his
ATTORNEY.

July 25, 1967 J. P. HAAS 3,332,326
SLITTER AND SCORER ASSEMBLY
Filed Sept. 21, 1964 4 Sheets-Sheet 2

INVENTOR.
JAMES P. HAAS.
BY Oscar B Brumback
his ATTORNEY.

July 25, 1967

J. P. HAAS 3,332,326

SLITTER AND SCORER ASSEMBLY

Filed Sept. 21, 1964

INVENTOR.
JAMES P. HAAS
BY Oscar B Brumback
his
ATTORNEY.

July 25, 1967
J. P. HAAS
3,332,326
SLITTER AND SCORER ASSEMBLY
Filed Sept. 21, 1964
4 Sheets-Sheet 4
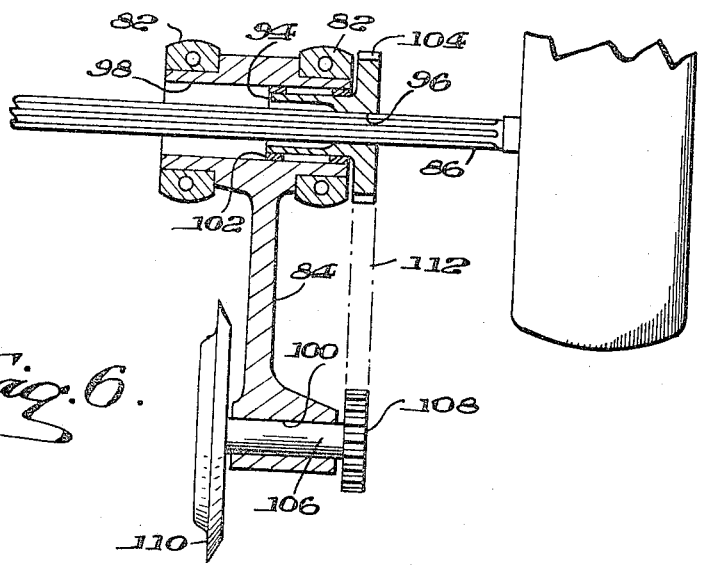
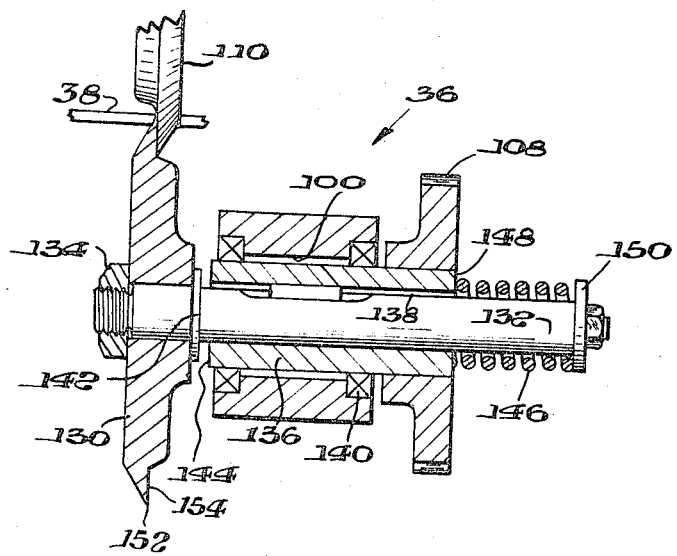
INVENTOR.
JAMES P. HAAS.
BY
Oscar B Brumback
his
ATTORNEY.

United States Patent Office 3,332,326
Patented July 25, 1967

3,332,326
SLITTER AND SCORER ASSEMBLY
James P. Haas, Baltimore, Md., assignor to Koppers Company, Inc., a corporation of Delaware
Filed Sept. 21, 1964, Ser. No. 397,723
8 Claims. (Cl. 93—58.2)

ABSTRACT OF THE DISCLOSURE

A slitter and scorer assembly for operating on a continuously moving web such as corrugated paperboard, the assembly comprising a plurality of coacting slitter-scorer units located above and below the web, which units are provided with internally threaded members capable of driven rotation about a threaded cross-shaft for selective individual lateral adjustment of the units for spacing the slitting/scoring members across the web, the internally threaded members, when locked against rotation, providing collective lateral adjustment of all the units upon rotation of the threaded cross-shaft to align the units with the web, the assembly being further characterized by means, such as a hydraulic activator, for separating the coacting upper and lower slitter/scorer units to permit lateral adjustment of the units, a further feature being the provision of suitable gearing to rotate the scorer units at a different velocity than the slitter units which is desirable in the manufacture of corrugated paperboard webs.

---

This invention relates generally to a slitter and scorer assembly and more particularly to a slitter-scorer assembly that includes a plurality of slitter-scorer units that are adjustable transversely relative to the travel of a continuous moving web of corrugated paperboard passing therebetween.

In the processing of sheet material, especially an endless web of corrugated paperboard, it is highly desirable to form the web as wide as possible and then slit the web into narrower strips. Score lines are also usually made in the web of corrugated paperboard at about the same time as the web is slit into preselected widths. The web-forming apparatus is operated on a continuous basis and the operation is adjusted at intervals to change the widths of the strips for the production of carton blanks of preselected size.

Slitting and scoring of a continuously moving web is conventionally accomplished by a slitter scorer device that includes three separate sets of shafts supported by spaced-apart side frames. The shafts have slitting and scoring heads mounted thereon. While the heads of one of the sets of shafts are slitting and scoring the moving web, the operator manually adjusts the heads on the other two sets of inactive shafts to the desired transverse dimension or spacing for subsequent slitting and scoring of the web into different sized strips. This manual adjustment of the slitter-scorer heads is both time consuming and difficult to perform. Further, with the known slitter-scorer devices a plurality of sets of slitter-scorer heads are required and only one set of the plurality of sets is actively performing the slitting or scoring operation.

The set-up time for the positioning or adjusting of the heads on the two sets of inactive shafts that are not slitting and scoring the continuously moving web is excessive. With short orders, that is, where only a short length of the continuous web is slit and scored into the preselected width, the operator does not have sufficient time to accurately adjust and set up the slitting and scoring heads on the inactive shafts for the next differently sized order. Interruption in the continuous process is occasionally required until the operator correctly adjusts the slitter-scorer heads on the inactive shafts.

In accordance with this invention, a novel arrangement is provided for adjusting the positions of the heads relative to a web with great saving in manpower.

In the operation of the slitter-scorer apparatus it is also highly desirable to provide a circumferential velocity for the slitter heads that is slightly higher than the speed of the web of corrugated paperboard moving therebetween. The circumferential velocity of the scorer head, however, should be substantially equal to board speed. Where, as in the past, both the slitter and scorer heads are mounted on a common drive shaft, this optimum condition cannot be obtained. It is an object of the invention to provide separate scoring and slitting sections so that optimum speeds of the heads may be obtained.

The slitter-scorer apparatus of this invention includes a compact unitary device that has a plurality of pairs of slitter-scorer units arranged on common supporting shafts. A means is provided on the slitter-scorer device of this invention for rapidly adjusting the relative positions of the sets of slitter and scorer devices without the need, as has been the practice in the past, for inactive slitter or scorer heads that are manually adjusted for subsequent use in slitting and scoring the continuously moving web into strips having different dimensions than the strips cut by the active heads.

Briefly, the invention includes a unitary slitter-scorer apparatus that has a pair of side frames with a plurality of supporting shafts extending transversely therebetween. Arranged parallel to and associated with pairs of the supporting shafts are slitter-scorer adjusting shafts and slitter-scorer drive shafts. The supporting shafts are arranged in overlying relation with each other to form upper supporting shafts and lower supporting shafts. Slitter or scorer units or carriages are positioned on the upper and lower supporting shafts and are movable transversely thereon. The slitter-scorer carriages have slitter or scorer heads extending forwardly therefrom that are arranged to be positioned in operative relation with the continuous web of corrugated paperboard moving therebetween. The slitter-scorer carriages are arranged in pairs and preferably separate supporting shafts are provided for the slitter carriages and separate supporting shafts are provided for the scorer carriages so that the circumferential velocity of the slitter heads may be slightly greater than the velocity of the continuously moving web passing therebetween. Each of the slitter or scorer carriages has an independent adjusting means associated therewith that is operable to move the individual slitter or scorer carriages transversely between the assembly side frames. A common adjusting means is provided to move all of the slitter-scorer heads transversely as a unit between the assembly side frames. Each of the slitter-scorer carriages includes a means to move the slitter or scorer head associated therewith toward and away from the web of corrugated paperboard continuously moving therebetween.

Accordingly, the principal object of this invention is to provide a slitter-scorer assembly that includes a plurality of slitter-scorer carriages that are rapidly and automatically adjustable relative to a continuous web of corrugated paperboard passing therebetween.

Another object of this invention relates to a slitter-scorer assembly in which all of the slitter-scorer carriages can be transversely adjusted as a unit relative to the web of corrugated paperboard passing therebetween.

Another object of this invention is to provide a slitter-scorer carriage that includes a means to independently move each carriage on supporting means extending transversely to a continuously moving web of corrugated paperboard.

Another object of this invention is to provide a slitter-scorer carriage that includes means to move two cooperating slitter-scorer heads toward and away from the continuously moving web of corrugated paperboard.

Another object of this invention is to provide a slitter-scorer assembly in which the slitter heads have a circumferential velocity slightly greater than the velocity of the continuously moving web of corrugated paperboard passing therebetween while the scorer heads have a circumferential velocity substantially equal to the velocity of said web.

These and other objects and advantages of the invention will be more completely disclosed and described in the following specification, the accompanying drawings and the appended claims.

In the drawings:

FIGURE 6 is a view in section taken along the line 6—6 of FIG. 4 illustrating the drive for the upper slitter head.

FIGURE 7 is a fragmentary view in section and in front elevation taken along the line 7—7 of FIG. 4 illustrating the tensioning means for the lower slitter head.

Figure 1:
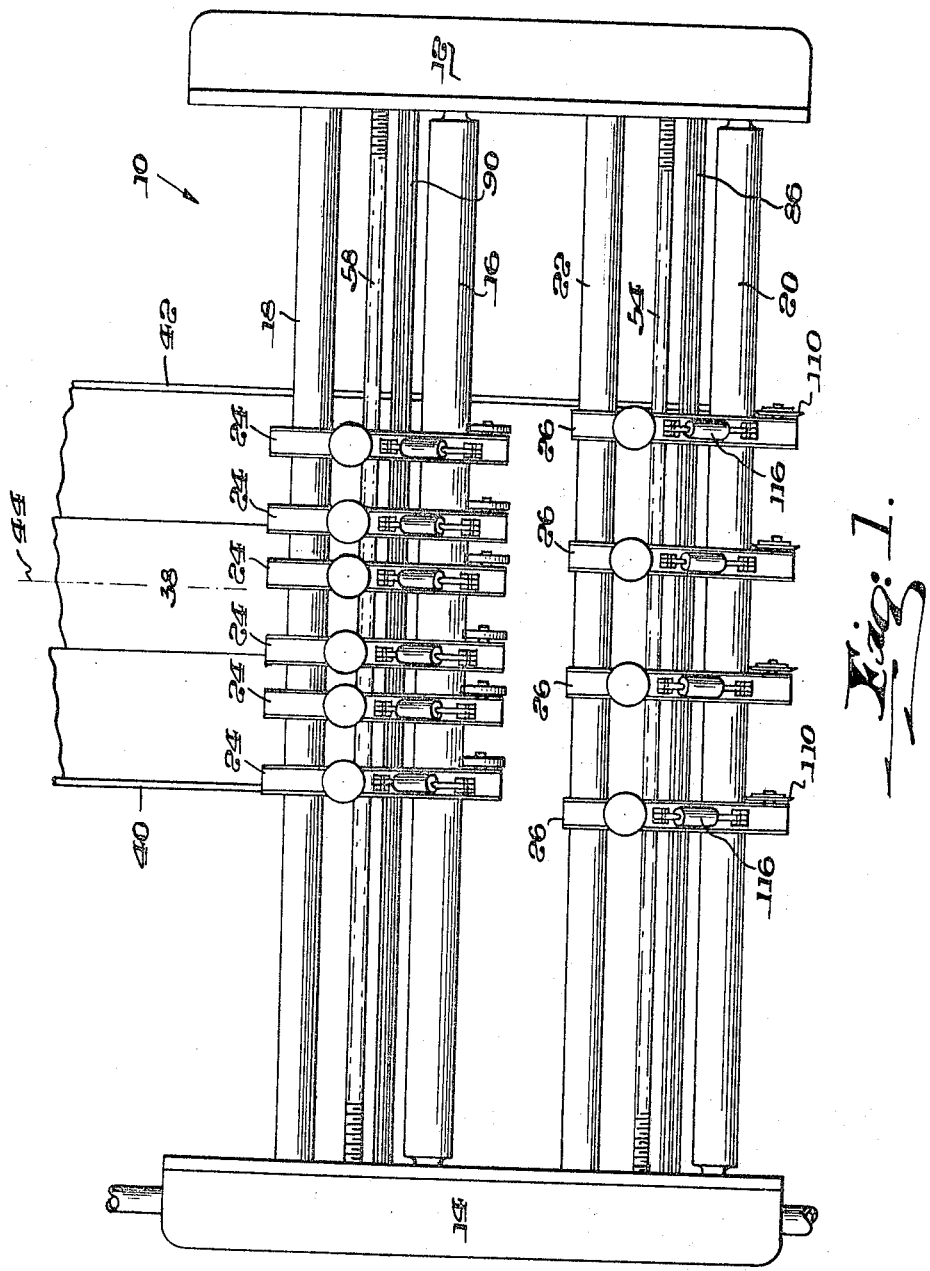
FIGURE 1 is a top plan view of the slitter-scorer assembly illustrating a plurality of scorer units arranged on a pair of transverse supporting shafts and a plurality of slitter units arranged on another pair of supporting shafts.
Figure 2:
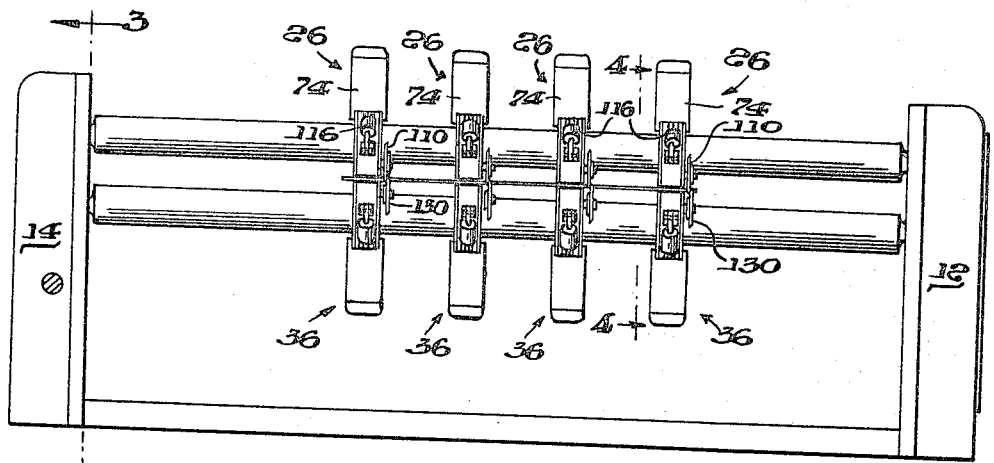
FIGURE 2 is a view in front elevation illustrating pairs of slitter units arranged on upper and lower supporting shafts.
Figure 3:
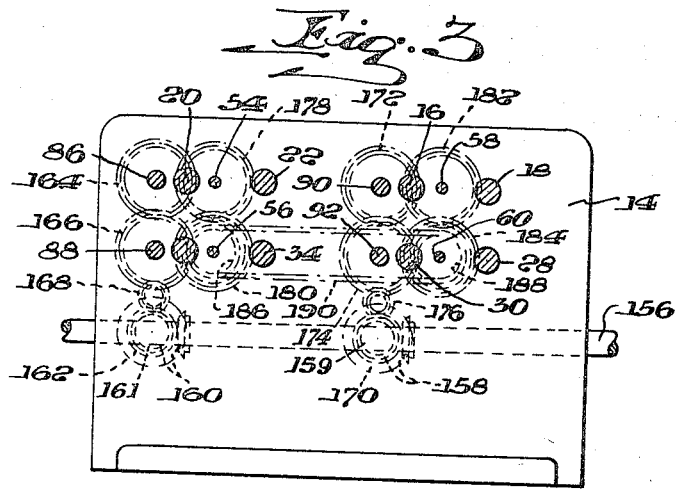
FIGURE 3 is a view in section taken along the line 3—3 of FIG. 2 illustrating the drive and common adjustment mechanism for the slitter and scorer units.

Referring to FIGURES 1–3, the slitter-scorer assembly generally designated by the numeral 10 includes a pair of side frames 12 and 14. Extending transversely between the side frames 12 and 14 and fixedly secured thereto are upper guide or supporting shafts 16, 18, 20 and 22 arranged in parallel spaced relation to each other. The guide shafts 16 and 18 slidably support six upper scorer units, each generally designated by the numeral 24. The guide shafts 20 and 22 support four upper slitter carriages or units, each generally designated by the numeral 26.

Beneath the upper guide shafts 16 and 18 are another pair of lower guide shafts 28 and 30 illustrated in section in FIGURE 3. Secured to the guide shafts 28 and 30 are lower scorer carriages (not illustrated) that are similar in construction to the upper scorer carriages and similar in construction to the lower slitter carriages, to be later described in detail. Beneath the guide shafts 20 and 22 is another pair of lower guide shafts 32 and 34 which support lower slitter carriages generally designated by the numeral 36 in FIGURE 2.

The upper and lower slitter or scorer carriages are movable transversely on the respective upper and lower guide shafts relative to a continuously moving web of corrugated paperboard, indicated in FIGURES 1 and 2 by the numeral 38. The continuously moving web 38 has edge portions 40 and 42 and a center line, indicated by the numeral 44.

The scorer carriages, both upper scorer carriage 24 and the lower scorer carriage, not illustrated, are similar in construction to the slitter carriages 26 and 36. The slitter carriages 26 and 36 will be described in detail and it should be understood that the scorer carriages have substantially the same construction other than the type of head associated therewith.

Figure 4:
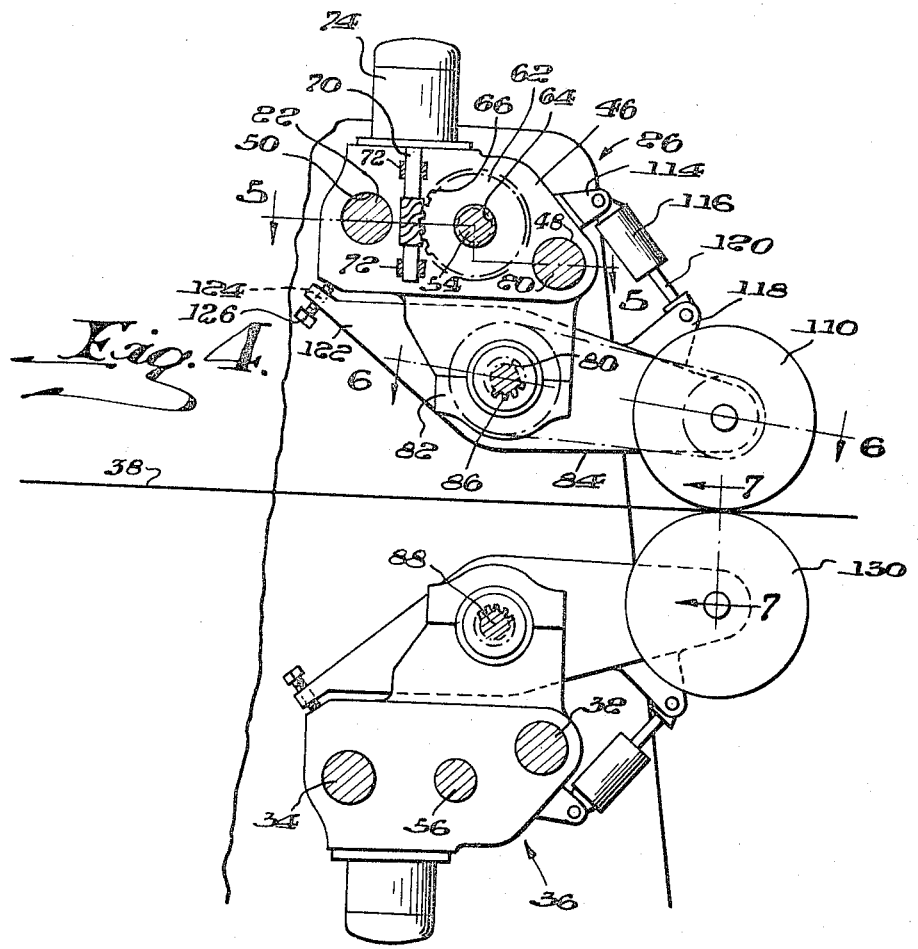
FIGURE 4 is a view in section and in side elevation taken along the line 4—4 of FIG. 2 illustrating in detail a pair of slitter units.

FIGURE 4, which is a section taken along the line 4—4 of FIGURE 2, illustrates the upper and lower slitter carriages 26 and 36. Since the upper carriage 26 is similar to the lower carriage 36, similar numerals will be used to designate similar parts. The slitter carriages 26 has a slidable frame 46 with a pair of bores 48 and 50 extending laterally therethrough. The guide shafts 20 and 22 extend through the repsective bores 48 and 50 so that the slidable frame 46 is movable longitudinally along the shafts 20 and 22.

Figure 5:
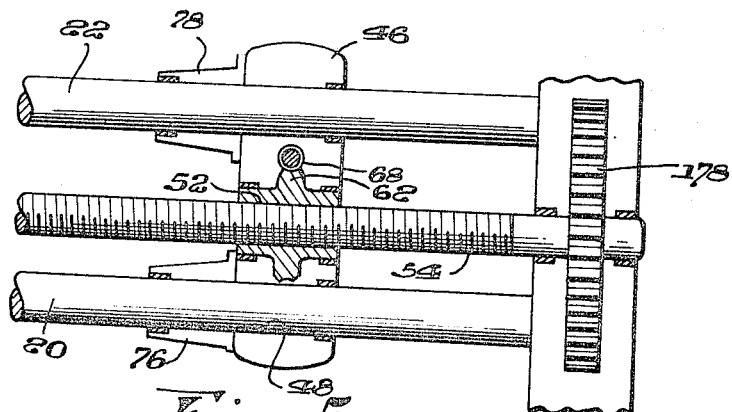
FIGURE 5 is a view in section taken along the line 5—5 of FIG. 4 illustrating the adjusting screw for the upper slitter unit illustrated in FIG. 4.

As illustrated in FIGURE 5 the slidable frame 46 has a pair of tubular lateral extensions 76 and 78 coaxially aligned with bores 48 and 50 through which the guide shafts 20 and 22 extend. The lateral extensions 76 and 78 stabilize the slidable frame 46 on the guide or support shafts 20 and 22.

The slidable frame 46 has another bore 52 through which an adjusting shaft or screw shaft 54 extends. The shaft 54 is illustrated in FIGURES 1, 3, 4 and 5. The lower slitter unit 36 has a similar adjusting shaft 56 extending laterally therethrough. Associated with the scorer units are a pair of similar adjusting shafts 58 and 60, illustrated in FIGURE 3. The adjusting shafts 54, 56, 58 and 60 are externally threaded shafts so that the scorer or slitter carriages associated with the respective adjusting shaft are moved axially on the adjusting shaft when the shafts are rotated in the supporting side frames 12 and 14 as later described.

The adjusting mechanism for the slitter or scorer units includes a gear 62 supported in the slidable frame 46 (FIGURES 4 and 5). The gear 62 has an internally threaded bore 52 and is coaxially positioned on the respective adjusting shaft, for example, adjusting shaft 54 for the upper scorer unit 26. The gear 62 is suitably mounted in the slidable frame 46 so that the rotation of adjusting shaft 54 will move the stationary gear 62 and the slidable frame 46 axially on the threaded adjusting shaft 54. The internally threaded gear 62 has an externally toothed portion 66 that meshes with a worm gear 68 formed on a vertical shaft 70. The vertical shaft 70 is suitably supported by bearings 72 on the slidable frame 46 and has one end portion connected to an adjusting motor 74. Thus, when the adjusting shaft 54 is stationary and the motor 74 is energized, the worm gear 68 rotates the gear 62 and moves the slidable frame 46 and hence the upper slitter unit 26 laterally on the adjusting shaft 54 and the guide shafts 20 and 22.

Two means are, therefore, provided for laterally adjusting the slitter or scorer units. One adjusting means includes rotating the adjusting shaft 54 while maintaining the gear 62 within the slidable frame 46 stationary. The other adjusting means includes maintaining the adjusting shaft stationary and rotating the gear 62 relative thereto by means of the worm gear 68 that is driven by the adjusting motor 74. The threaded adjusting shaft 54, gear 62 and worm gear 68 are illustrated in detail in FIGURE 5.

The slidable frame 46 has a depending portion or pivot arm 84 with a lateral bore 80 extending therethrough. A cap member 82 is secured to the lower portion of slidable frame 46 to removably support the pivot arm 84 extending forwardly from the slidable frame 46. Extending through the bore 80 is an externally toothed or splined drive shaft 86 that is arranged to drive the slitter or scorer heads.

Referring to FIGURE 3, drive shaft 86 is illustrated associated with the upper slitter unit 26. Other drive shafts 88, 90 and 92 are associated with the lower slitter units, upper scorer units and lower scorer units respectively. The drive shafts 86–92 extend transversely between the side frames 12 and 14 and are driven in a preselected manner, as will later be described.

Each of the slitter or scorer units has a tubular shaft 94 (FIGURE 6) and an internally toothed bore 96 through which the drive shaft 86 extends. The diameter of the internally toothed bore 96 is such that tubular shaft 94 is drivingly associated with the shaft 86 and rotation of shaft 86 is transmitted through the internally toothed portion 96 to the tubular shaft 94. The pivot arm 84 has a lateral bore 98 adjacent one end and another lateral bore 100 adjacent the other end. The tubular member 94 is suitably supported within bore 98 by means of bearings 102 so that the tubular member 94 is freely rotatable in bore 98 or arm 84 and is restrained from axial movement relative thereto. Lower cap member 82 pivotally secured the arm 84 to the lower portion of slidable frame 46.

The tubular shaft 94 has an externally toothed sprocket 104 formed thereon that is arranged to transmit rotation from the drive shaft 86 to the slitter head. A supporting shaft 106 extends through the bore 100 in the other end of arm 84 and is freely rotatable therein. Connected to one end of shaft 106 is a sprocket 108 and connected to the other end of shaft 106 is a slitter head 110. A suitable connecting device, such as an endless chain 112 diagrammatically illustrated in FIGURE 6, drivingly connects the sprocket 104 to the sprocket 108. Thus, upon rotation of drive shaft 86, the rotation of sprocket 104 is transmitted through the endless chain 112 to sprocket 108 which in turn drives the slitter head 110 through shaft 106. With this arrangement the drive shaft 86 drives the slitter head 110. Other types of drive means between the tubular shaft 94 and shaft 106, such as a pair of sheaves and an endless V belt, of course, may be used.

The slidable frame 46 has a clevis mechanism 114 secured thereto with a hydraulic activator 116 pivotally connected thereto. The arm 84 has an upwardly extending clevis 118 to which the extensible and retractable rod 120 of activator 116 is pivotally secured. Suitable means are provided to connect the opposite ends of the cylinder portion of the activator 116 to a source of pressurized hydraulic fluid to extend or retract the rod 120. Activator 116 thus controls the relative position of the arm 84 relative to the sliding frame 46.

Since the slitter head 110 is rotatably connected to the arm 84, the activator 116 serves as an orienting means to maintain the slitter head 110 in preselected spaced relation relative to the endless web of corrugated paperboard 38 passing therebeneath. The arm 84 has a rearwardly extending portion 122 with a threaded bore 124. An adjusting screw 126 extends through the threaded bore 124 and is arranged to abut a portion of the sliding frame 46. The adjusting screw 126 provides a stop mechanism for the arm 84 and the slitter head 110 to thereby limit the clockwise rotation of the arm 84 about the drive shaft 86 toward the web 38.

There is also included with the slitter units a means for accurately locating the slitter heads for cleaning slitting. In FIGURE 7 the lower slitter unit generally designated by the numeral 36 is illustrated in section with a slitter head 130 connected to a driving shaft 132 by means of a bolt 134. The shaft 132 is nonrotatably secured in a tubular shaft 136 by means of the mating key 138. The key 138 prevents rotation of the shaft 132 relative to the shaft 136 but permits axial movement of shaft 132 within the tubular shaft 136. The tubular shaft 136 is suitably supported within the bore 100 of the pivot arm 84 by means of bearings 140.

Tubular shaft 136 has a sprocket 108 secured thereto which is connected by means of a chain 112 to a driving sprocket 104, as is illustrated in FIGURE 6. The shaft 132 has an enlarged portion 142 that abuts an edge 144 of the tubular shaft 136 to limit axial movement of the shaft 132 toward the arm 84. A coil spring 146 surrounds the shaft 132 and abuts at one end the other end portion 148 of tubular shaft 136 and an enlarged portion 150 on the end portion of shaft 132. The spring 146 is utilized to cause the two slitter heads, that is lower slitter head 130 and upper slitter head 110, to rub against each other with a desired pressure. The slitter heads have a knife edge portion 152 with a radially extending planar wall 154.

For the optimum slitting of the paperboard passing therebetween it is desirable that the planar portions 154 of the respective slitter heads 110 and 130 rub against each other to cleanly slit the web of paperboard passing therebetween. The coil spring 146 urges the planar portion 154 of lower slitter head 130 against the planar portion 154 of the upper slitter head 110.

If the upper slitter head 110 is moved laterally to the left as is illustrated in FIGURE 7, the spring 146 is compressed and the shaft 132 moves to the left with the planar portions of the respective slitter heads 110 and 130 being maintained in desired abutting relation. The resiliency of the coil spring 146 is so selected that, when the shaft enlarged portion 142 is slightly spaced from the shaft 136, the desired pressure is maintained between the planar portions 154 of the respective slitter heads 110 and 130.

Where it is desired to eliminate the lower slitter units, the cutting edge of the upper slitter heads 110 may be fabricated with a saw toothed type edge along its entire periphery so that it operates in the manner of a rotary saw. With this arrangement a lower support for the continuously moving web, such as rollers or the like, may be provided to absorb the downward action generated by the upper slitter head 110.

The drive arrangement for the respective drive shafts 86, 88, 90, 92 and for the adjusting shafts 54, 56, 58 and 60 is illustrated in FIGURE 3. The relative positions of the shafts have been changed in FIGURE 3 to more clearly illustrate the various drive and adjustment gearing arrangements.

In the construction illustrated herein, drive shaft 86 extends through the upper slidable frame 46 below the adjusting shaft 54, and drive shaft 88 extends through the lower slidable frame above the adjusting shaft 56. A line shaft 156 is rotatably driven by a motor, not shown. The line shaft 156 has a first pair of conventional bevel gears 158 and a second pair of conventional bevel gears 160 associated therewith. These pairs of bevel gears provide for the axis of rotation being transferred in a perpendicular direction. Thus rotation of shaft 161 is in a direction normal to the rotation of line shaft 156. The shaft 161 is suitably supported by the side frame 14 and includes another gear 162. The drive shafts 86 and 88 have a pair of meshing spur gears 164 and 166 secured thereto. The gear 162 on shaft 161 meshes with an idler gear 168 which in turn meshes with gear 166 to provide a constantly meshing gear train between bevel gear 160 secured to and rotatable with line shaft 156 and the drive shafts 86 and 88. Thus, the line shaft 156 provides a drive for the drive shafts 86 and 88 at a preselected speed depending on the diameter of the gears in the gear train 162, 168, 166 and 164. As previously discussed, it is highly desirable that the circumferential velocity of the slitter heads 110 and 130 be slightly higher than the velocity of the endless web of corrugated paperboard passing therebetween. With the previously described gearing arrangement, it is now possible to drive the slitter heads 110 and 130 at a slightly higher circumferential velocity than the web of paperboard passing therebetween.

The upper and lower scorer heads are driven in substantially the same manner as the slitter heads previously described. The line shaft 156 has a pair of bevel gears 158 secured thereto and rotatable therewith. The one bevel gear 158 has a shaft 159 that is suitably supported in the side frame 14. Shaft 159 also has secured thereto another gear 170. The drive shafts 90 and 92 have a pair of meshing gears 172 and 174 associated therewith. An idler gear 176 connects the gear 170 of shaft 159 to the drive gears 172 and 174 so that upon rotation of line shaft 156 the scorer drive shafts 90 and 92 are rotated to provide drive for the scorer heads in a manner similar to the drive for the slitter heads previously described.

Also provided in the side frame 14 is a means to actuate all of the adjusting shafts 54, 56, 58 and 60 at the same time and with the same circumferential velocity. There is provided within the side frame 14, gears 178, 180, 182 and 184 connected to the adjusting shafts or screws 54, 56, 58 and 60 respectively. The gears 178 and 180 are in meshing relation with each other, as are the gears 182 and 184. The upper and lower adjusting shafts 54 and 56 have preferably right and left handed threads thereon so that rotation in the opposite directions by means of gears 178 and 180 will provide adjustment for the slitter units 26 and 36 in the same direction. The adjusting shafts 58 and 60 associated with the scorer units should also be arranged so that rotation of the shafts 58 and 60 in opposite directions will provide for movement of the upper and lower scorer heads in the same direction.

The shafts 56 and 60 have sprockets 186 and 188 connected thereto for rotation therewith. An endless chain 190 connects sprockets 186 and 188 to each other so that the same amount of adjustment of shafts 54 and 56 will be provided for adjusting shafts 58 and 60. A means (not shown) is provided to rotate either of the sprockets 186 or 188 in ether a clockwise or counterclockwise direction to thereby adjust the slitter and scorer units together along the respective guide shafts. This adjustment means provided by the gears 178, 180, 182 and 184 permits the slitter and scorer units to be adjusted laterally on the guide shafts for proper edge alignment relative to the edges 40 and 42 of the continuously moving web 38.

In operation, the endless web of corrugated paperboard 38 passes between the respective slitter and scorer heads. Sprockets 186 and 188 are rotated to properly align the slitter and scorer heads relative to the edges 40 and 42 of the endless web of corrugated paperboard 38. The individual motors 74 on the respective pairs of slitter or scorer units are energized to properly position the slitter and scorer units to slit the endless web of corrugated paperboard into a plurality of strips.

In FIGURE 1 there is illustrated the slitter units 26 cutting or slitting the web 38 into three separate strips. The desired dimension of the scores in the respective strips is selected and the motors 74 are energized to move the respective scorer units to provide the desired dimension between the scorers on the respective strips cut from the continuous web 38.

The line shaft 156 is activated to drive the respective drive shafts 86, 88, 90 and 92 to in turn drive the respective slitter and scorer heads through the drive arrangement illustrated in FIGURES 4 and 6. The individual activators 116 on the upper and lower slitter or scorer units are controlled so that the respective slitter and scorer heads are properly oriented relative to the endless web of corrugated paperboard passing therebetween. Activators 116 will cause cooperating heads to move apart when adjustment of heads is made while web is passing through. Moving heads apart, however, is not required for simple edge alignment. The springs 146 associated with the lower slitter heads 130 maintain the proper abutting pressure between the upper and lower slitter heads 110 and 130.

Where the dimension of the endless web of corrugated paperboard changes or the web is moved laterally relative to the slitter-scorer assembly 10, the edge alignment gear train can be activated to move the slitter and scorer assemblies as a unit laterally relative to the endless web of corrugated paperboard. Where it is desired to change the dimension of the strips that are cut or slit from the endless web 38 as previously stated, cooperating heads are moved apart by means of activators 116 and the individual motors 74 are energized to adjust the relative position of the respective slitter and scorer devices on the guide shafts. Where the thickness of the web of corrugated paperboard changes, the operating position of cooperating scorer heads is changed by adjustment of stop screws 126. Where it is desired to deactivate certain of the slitter or scorer heads, the activators 116 are activated to retract the respective rods 120 and move the slitter or scorer heads away from the endless web 38.

Although only six scorer units and four slitter units have been illustrated, it is apparent that a greater number of slitter and scorer heads may be positioned on the respective guide shafts to provide units for slitting a greater number of strips from the web 38 and providing a larger number of scorers in each strip. It should also be understood that, although the scorer units and the slitter units are illustrated as positioned on separate guide shafts and driven by separate drive shafts, both the slitter units and the scorer units could be positioned on the same guide shafts. With this arrangement the sprockets 104 and 108 associated with the slitter units could be arranged to provide the desired circumferential velocity for the slitter heads 110 and 130.

It is possible to rapidly adjust the relative position of the slitter and scorer heads to change the relative dimension of the strips cut cut from an endless web of corrugated paperboard to change the relative spacing of the longitudinal scores formed in the strips cut from the web 38. All of the slitter and scorer heads may be adjusted laterally relative to the endless web by means of a common adjusting means so that edge alignment may be rapidly accomplished. Activators 116 provide pinching force and the proper spacing of the slitter or scorer heads relative to the endless web of corrugated paperboard passing therebetween is provided by screws 126. The slitter and scorer heads are secured to the end of a pivot arm so that they can be fabricated in a unitary manner and not in halves as has been the previous practice.

What is now considered to represent an advantageous embodiment has been illustrated and described. However, it should be understood that, within the scope of the appended claims, the invention may be practiced otherwise than as specifically illustrated and described.

I claim:

1. A carriage for a slitting and/or scoring machine comprising
 a frame having a first lateral passageway therethrough,
 a tubular member having an internally threaded portion suitably positioned in said first passageway,
 means on said frame connected to said tubular member and arranged to rotate said tubular member relative to said frame,
 said tubular member arranged to threadedly engage the externally threaded portion of an adjusting shaft so that said frame member moves axially on said threaded shaft upon rotation of said tubular member in said first lateral passageway,
 a web engaging member rotatably connected to said frame member, and
 drive means to rotate said web engaging member.

2. A carriage for a slitting and/or scoring machine as set forth in claim 1 which includes
 a locking means on said frame to nonrotatably secure said tubular member to said frame so that upon rotation of said externally threaded adjusting shaft said carriage moves axially thereon.

3. A carriage for a slitting and/or scoring machine as set forth in claim 1 which includes
 an arm member pivotally secured to said frame,
 means connected to said arm member and said frame member and operable to pivot said arm member relative to said frame member to thereby move said web engaging member relative to said frame.

4. A carriage for a slitting and/or scoring machine as set forth in claim 1 which includes
 a second lateral passageway through said frame member,
 a second tubular member having an internally splined portion rotatably positioned in said second passageway,
 said second tubular member arranged to be nonrotatably positioned on a plined drive shaft so that said second tubular member is movable axially on said drive shaft and rotatable therewith, and means connecting said second tubular member to said web engaging member so that upon rotation of said drive shaft said web engaging member rotates on said frame member.

5. A carriage for a slitting and/or scoring machine as set forth in claim 1 which includes a pair of lateral passageways extending through said frame member, said passageways arranged to receive a pair of support shafts in a manner that said frame member is axially movable on said pair of support shafts.

6. A machine for slitting and/or scoring a continuously moving sheet comprising a pair of side frames arranged to be positioned on opposite sides of said continuously moving sheet, supporting means secured to and extending transversely between said frames above said continuously moving sheet, an adjusting shaft rotatably supported in said side frames and extending transversely therebetween, a drive shaft rotatably supported in said side frames and extending transversely therebetween, a plurality of carriages positioned on said supporting means above said continuously moving sheet, said carriages each having
a lateral passageway therethrough,
an internally threaded tubular member rotatably positioned in said passageway,
means to rotate said tubular member in said passageway and to nonrotatably secure said tubular member therein,
an arm member pivotally secured thereto and extending therefrom,
a web engaging member rotatably secured to said arm member, said adjusting shaft extending axially through said internally threaded tubular members in threaded engagement therewith so that upon rotation of said threaded adjusting shaft said carriages move transversely on said adjusting shaft externally threaded portion and upon rotation of said respective internally threaded tubular member on said adjusting shaft said carriages move transversely on said adjusting shaft externally threaded portion, means connecting said drive shaft in said web engaging members on said plurality of carriages so that upon rotation of said drive shaft said web engaging member rotates relative to said carriage, means to rotate said adjusting shaft to move all of said carriages transversely on said adjusting shaft, and means to rotate said drive shaft to thereby rotate all of said web engaging members on said carriages.

7. A machine for slitting and/or scoring a continuously moving web, comprising:

a pair of side frames positioned on opposite sides of said web;

support means secured to and extending transversely between said side frames above and below said web;

a plurality of carriages positioned on said support means above and below said web, said carriages being movable transversely on said support means;

a pair of adjusting shafts rotatably supported in said side frames and extending transversely therebetween, one of said adjusting shafts operatively connected to said carriages positioned above said web and the other of said adjusting shafts operatively connected to said carriages positioned below said web, said pair of adjusting shafts connected to said carriages so that upon rotation of said adjusting shafts all of said carriages connected thereto move transversely relative to said web substantially the same distance; and gearing connecting said adjusting shafts so that both of said adjusting shafts rotate at the same angular velocity;

said adjusting shafts each having an externally threaded portion, said carriages each having a lateral passageway therethrough with an internally threaded tubular member rotatably positioned therein, said adjusting shafts extending axially through said tubular member in said carriages respectively and in threaded engagement therewith, said carriages each having locking means to non-rotatably secure said tubular member thereto so that upon rotation of said adjusting shafts, all of said carriages move transversely on said adjusting shaft externally threaded portion, and said carriages each having means to rotate said tubular member in said passageway independently of the other tubular members so that upon rotation of said tubular member relative to said adjusting shaft said carriage moves transversely on said adjusting shaft externally threaded portion transversely relative to the others of said carriages.

8. A carriage for a slitting and/or scoring machine having a rotatably driven web engaging member connected thereto, comprising:

a frame having a lateral passageway therethrough;

a tubular member rotatably secured in said passageway and having an internally threaded portion and an externally gear toothed portion; and a drive means secured to said frame and having a gear toothed output member in rotatable connection with said externally toothed portion for rotating said tubular member, said internally threaded portion of said tubular member adapted to engage an externally threaded portion of an adjusting shaft extending axially therethrough, said adjusting shaft having gearing means connected thereto for selectively holding said adjusting shaft against rotation and for selectively rotating said adjusting shaft, whereby said frame is movable laterally along said adjusting shaft upon non-rotation of said shaft and upon rotation of said tubular member by said drive means, said frame is also movable laterally along said adjusting shaft during rotation of said shaft and upon non-rotation of said tubular member.

References Cited

UNITED STATES PATENTS 2,043,818 6/1936 Thioedeau _____ 83—482
2,982,189 5/1961 Shields _____ 93—58
3,093,037 6/1963 Ward _____ 93—58

BERNARD STICKNEY, *Primary Examiner.*